(12) United States Patent
Hirose

(10) Patent No.: US 12,248,184 B2
(45) Date of Patent: Mar. 11, 2025

(54) OPTICAL CONNECTOR

(71) Applicant: Fujikura Ltd., Tokyo (JP)

(72) Inventor: Masayuki Hirose, Sakura (JP)

(73) Assignee: Fujikura Ltd., Tokyo (JP)

( * ) Notice: Subject to any disclaimer, the term of this patent is extended or adjusted under 35 U.S.C. 154(b) by 231 days.

(21) Appl. No.: 17/999,561

(22) PCT Filed: Apr. 21, 2021

(86) PCT No.: PCT/JP2021/016165
§ 371 (c)(1),
(2) Date: Nov. 22, 2022

(87) PCT Pub. No.: WO2022/070485
PCT Pub. Date: Apr. 7, 2022

(65) Prior Publication Data
US 2023/0236366 A1 Jul. 27, 2023

(30) Foreign Application Priority Data

Sep. 30, 2020 (JP) ................... 2020-165643

(51) Int. Cl.
*G02B 6/38* (2006.01)
(52) U.S. Cl.
CPC ......... *G02B 6/3869* (2013.01); *G02B 6/3882* (2013.01)
(58) Field of Classification Search
CPC ............................ G02B 6/3869; G02B 6/3882

USPC ........................................................... 385/78
See application file for complete search history.

(56) References Cited

U.S. PATENT DOCUMENTS

2013/0129301 A1* 5/2013 Yoshida ................ G02B 6/46
385/136
2020/0166711 A1 5/2020 Hu et al.

FOREIGN PATENT DOCUMENTS

| JP | 2004109161 A | * | 4/2004 |
| JP | 2007-078740 A | | 3/2007 |
| JP | 2010-080412 A | | 4/2010 |
| JP | 2011-007253 A | | 1/2011 |
| JP | 2020-024339 A | | 2/2020 |
| WO | WO-2020084744 A1 | * | 4/2020 |

OTHER PUBLICATIONS

International Search Report issued in corresponding International Application No. PCT/JP2021/016165 mailed Jul. 13, 2021 (2 pages).

* cited by examiner

*Primary Examiner* — Jerry M Blevins
(74) *Attorney, Agent, or Firm* — Osha Bergman Watanabe & Burton LLP

(57) ABSTRACT

An optical connector includes: a ferrule having a fiber hole into which an optical fiber is inserted and a guide hole into which a guide pin is inserted; a housing that accommodates the ferrule; and a biasing member disposed in the housing and applies to the ferrule a biasing force directed toward a side close to an opening portion of the housing in an axial direction of the guide hole, the biasing force having non-linear characteristics.

6 Claims, 10 Drawing Sheets

OPTICAL CONNECTOR

CROSS-REFERENCE TO RELATED APPLICATIONS

The present application claims priority from Japanese Patent Application No. 2020-165643, filed Sep. 30, 2020, the contents of which are incorporated herein by reference in their entirety.

BACKGROUND

Technical Field

The present invention relates to an optical connector.

Description of the Related Art

Patent Document 1 discloses an optical connector that includes a ferrule into which an optical fiber is inserted, and a biasing member that biases the ferrule. A guide hole into which a guide pin is inserted is formed in the ferrule. A guide pin of a male-side optical connector is inserted into a guide hole of a female-side optical connector, so that the two optical connectors are aligned.
Patent Document
Patent Document 1: JP No. 2020-24339

When the guide pin is inserted into the guide hole of the female-side optical connector, there is a case where shavings occurring due to scraping of the ferrule by the guide pin cause variation in connection loss between the connectors.

SUMMARY

An optical connector according to one or more embodiments can suppress variation in connection loss.

According to one or more embodiments, there is provided an optical connector including: a ferrule formed with a fiber hole into which an optical fiber is inserted and a guide hole into which a guide pin is inserted; a housing that accommodates the ferrule therein; and a biasing member that is accommodated in the housing and applies a biasing force directed toward a side close to an opening portion of the housing in an axial direction of the guide hole to the ferrule, the biasing force which has nonlinear characteristics.

According to one or more embodiments, the biasing force has nonlinear characteristics, so that it is possible to reduce a biasing force when a guide pin of a male-side optical connector is inserted into a guide hole of a female-side optical connector, while securing a biasing force acting on the ferrule after the optical connectors are connected to each other. Therefore, it is possible to suppress variation in the connection loss between the optical connectors due to shavings caused by scraping of a female-side ferrule.

According to one or more embodiments, in the optical connector according to the first aspect, the rate of change in the biasing force with respect to the amount of displacement of the ferrule in the axial direction in an assembly state before the ferrule comes into contact with another ferrule may be smaller than the rate of change in a connected state where the optical connector and another optical connector are connected to each other.

According to one or more embodiments, in the optical connector according to the first or second aspect, a spring constant of the biasing member may be a predetermined constant in a free state before the biasing member is accommodated in the housing, and be larger than the predetermined constant in a state where the ferrule is accommodated in the housing and pushed rearward.

According to one or more embodiments, in the optical connector according to any one of the first to third aspects, the biasing member may include an irregular pitch coil spring.

According to one or more embodiments, in the optical connector according to the fourth aspect, in the irregular pitch coil spring, a pitch at an intermediate portion in the axial direction may be smaller than a pitch at both end portions in the axial direction.

According to one or more embodiments, in the optical connector according to any one of the first to fifth aspects, the biasing member may include a first series spring and a second series spring having a larger spring constant than the first series spring, and the first series spring and the second series spring may be connected in series.

According to one or more embodiments, in the optical connector according to any one of the first to sixth aspects, the biasing member may include a first parallel spring and a second parallel spring having a smaller free length than the first parallel spring, and the first parallel spring and the second parallel spring may be connected in parallel.

According to one or more embodiments, in the optical connector according to any one of the first to seventh aspects, the biasing member may include a compression spring having an outer diameter that changes along the axial direction.

According to one or more embodiments, it is possible to provide an optical connector which is capable of suppressing variation in connection loss.

DETAILED DESCRIPTION

Hereinafter, an optical connector of one or more embodiments will be described based on the drawings.

Figure 1:
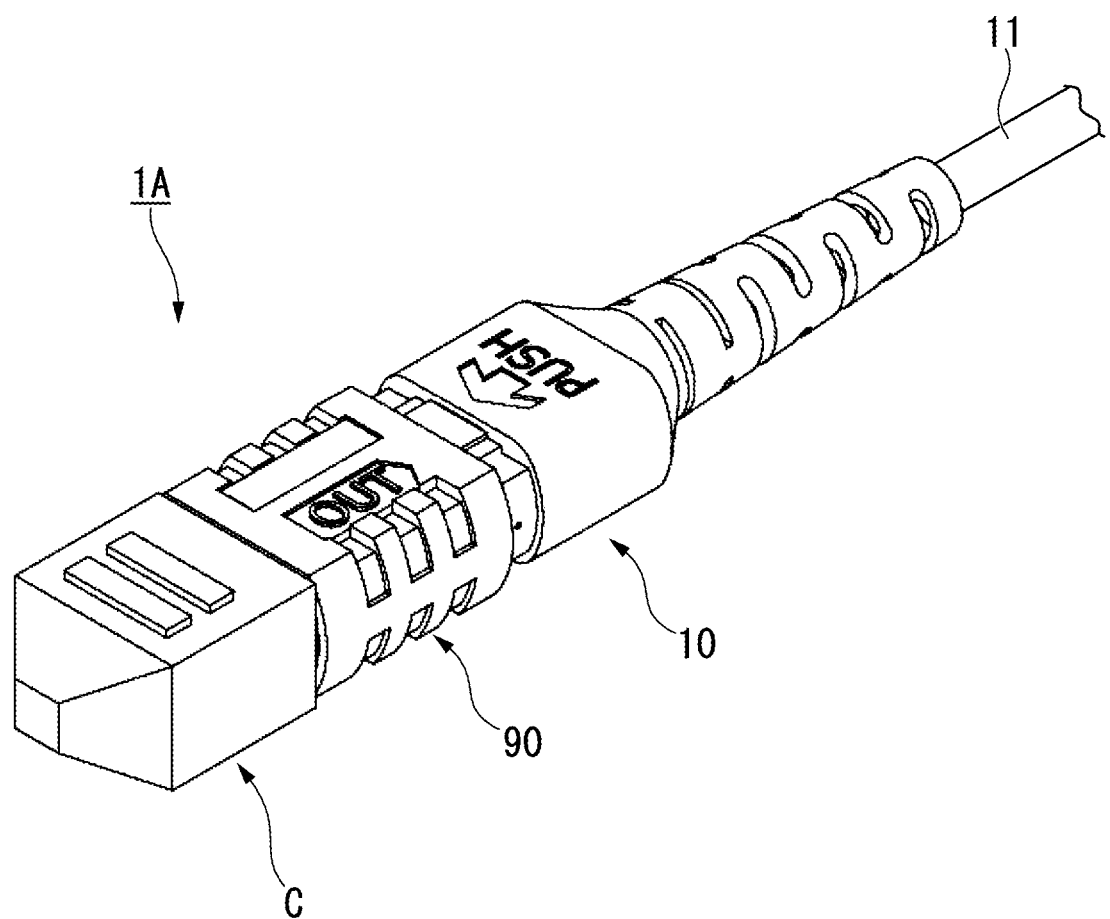
FIG. 1 is a perspective view of an optical connector according to one or more embodiments.
Figure 2:
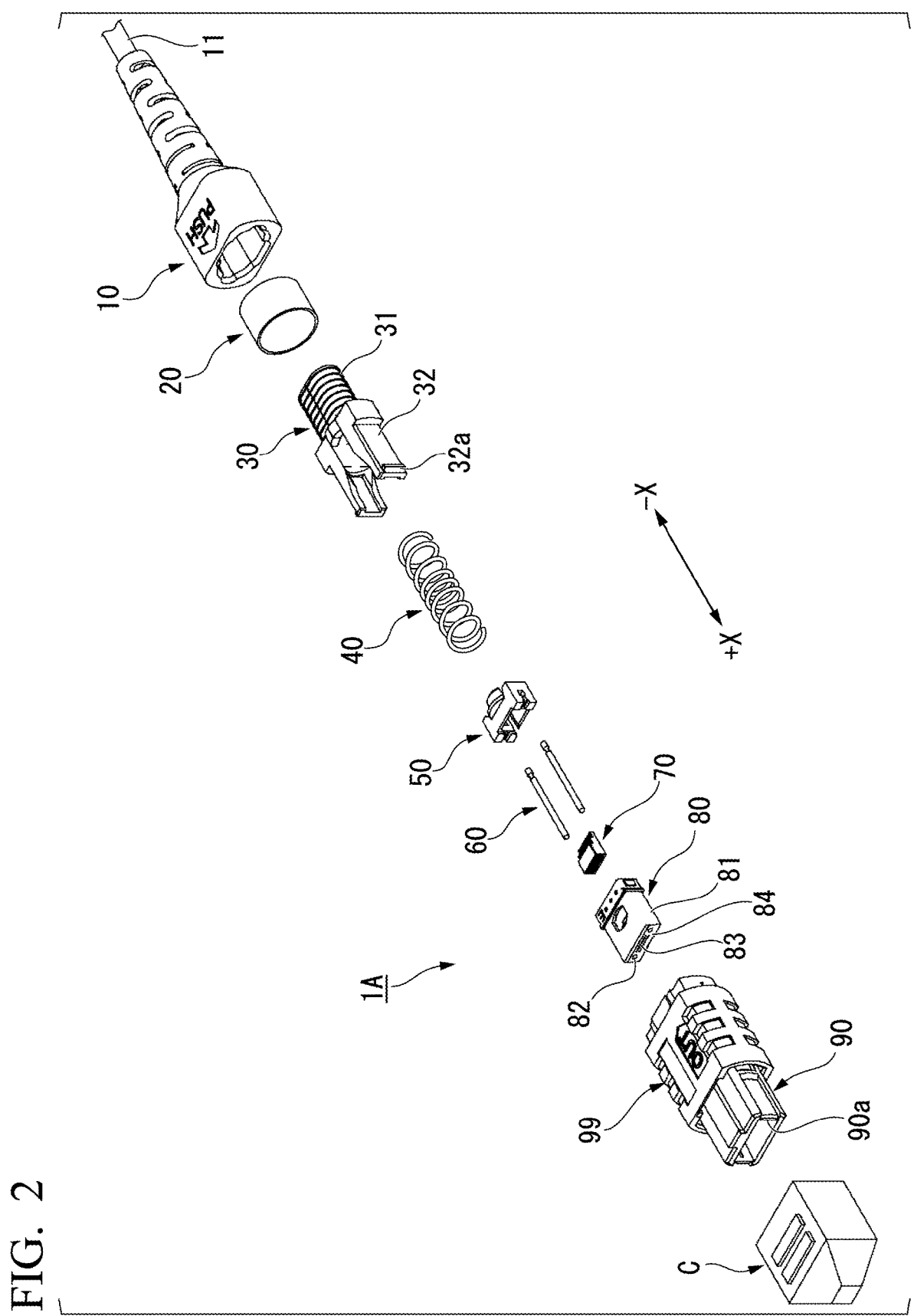
FIG. 2 is an exploded perspective view of the optical connector of FIG. 1.

As shown in FIGS. 1 and 2, an optical connector 1A includes a cable boot 10, a clamp ring 20, a support member 30, a biasing member 40, a pin clamp 50, two guide pins 60, a ferrule boot 70, a ferrule 80, a housing 90, a coupling 99, a cap C, and a plurality of optical fibers (not shown). The optical connector 1A of the present embodiment is a so-called MPO (Multi-fiber Push On) type.

A male-side optical connector 1A shown in FIG. 2 has the guide pin 60. However, a female-side optical connector 1B (refer to FIG. 4D) does not have the guide pin 60. In the following description, the structure of the male-side optical connector 1A will be described in detail as a representative of the two optical connectors 1A and 1B. In other words, the following description is also the description of the female-side optical connector 1B.

The male-side optical connector 1A and the female-side optical connector 1B may be different from each other only in the presence or absence of the guide pin 60, or may also be different from each other in other structures.

As shown in FIG. 2, the ferrule 80 has a main body portion 81 in which two guide holes 82 and a plurality of fiber holes 83 are formed. The guide holes 82 and the fiber holes 83 are open on a connection end face 84 of the main body portion 81. The guide pin 60 is inserted into each of the guide holes 82, and an optical fiber is inserted into each of the fiber holes 83. The number of fiber holes 83 that are provided in the ferrule 80 may be changed appropriately, and may be only one. That is, the number of optical fibers that are provided in the optical connectors 1A and 1B may be one or may be plural.

(Direction Definition)

In one or more embodiments, the direction in which the guide hole 82 extends is referred to as an axial direction. Further, the direction in which the two guide holes 82 or the two guide pins 60 are arranged is referred to as a right-left direction. The right-left direction is orthogonal to the axial direction. The direction orthogonal to both the axial direction and the right-left direction is referred to as an up-down direction.

In the axial direction, the side on which the biasing member 40 and the support member 30 are disposed as viewed from the ferrule 80 is referred to as a rear side (−X side), and the opposite side is referred to as a front side (+X side). The connection end face 84 is an end face on the front side of the main body portion 81 of the ferrule 80.

As shown in FIG. 2, the cable boot 10 is located at a rear end portion of the optical connector 1A. The cable boot 10 is formed in a tubular shape extending in the axial direction, and the optical fiber is inserted therein. A covering 11 extends rearward from the cable boot 10. The covering 11 covers the optical fiber. The clamp ring 20 clamps and fixes the support member 30 and the covering 11 inside the cable boot 10.

The support member 30, which is also called a spring push, includes a tubular portion 31 extending in the axial direction, two locking pieces 32 extending forward from the tubular portion 31, and two locking projections 32a each protruding from each of the locking pieces 32. Each locking projection 32a is locked in each of two locking holes 94 (refer to FIG. 4A) provided in the housing 90. In this way, the support member 30 is fixed to the housing 90.

As shown in FIG. 2, the biasing member 40 is interposed between the support member 30 and the pin clamp 50 in the axial direction. The biasing member 40 biases the ferrule 80 forward through the pin clamp 50. The biasing member 40 is a so-called nonlinear spring. The nonlinear spring is a spring whose spring constant changes according to a compression length. Hereinafter, specific examples of the biasing member 40, which is a nonlinear spring, will be described using FIGS. 3A to 3D.

Figure 3A:
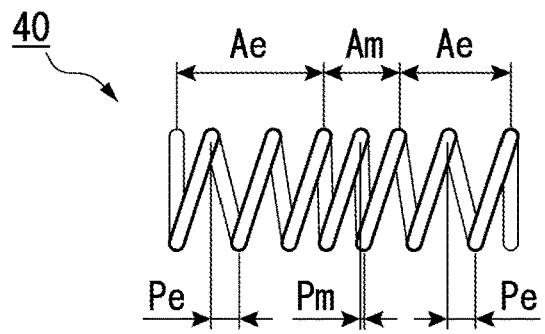
FIG. 3A is a diagram showing an example of a biasing member according to one or more embodiments.

The biasing member 40 shown in FIG. 3A is a compression spring with an irregular pitch (a so-called irregular pitch spring). The irregular pitch spring has end portion regions Ae that are located at both end portions in the axial direction, and an intermediate region Am that is located at an intermediate portion in the axial direction. A pitch Pe at the end portion region Ae is larger than a pitch Pm at the intermediate region Am.

Figure 3B:
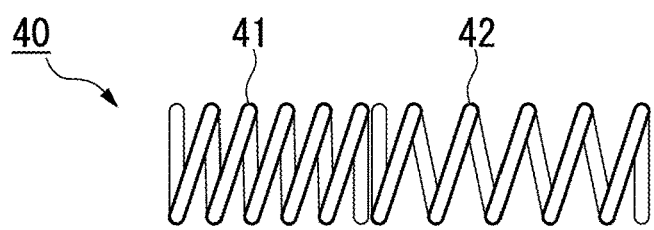
FIG. 3B is a diagram showing an example of a biasing member according to one or more embodiments.

The biasing member 40 shown in FIG. 3B includes a first series spring 41 and a second series spring 42 connected in series. The series connection means that a plurality of springs is disposed side by side in the axial direction. Both the first series spring 41 and the second series spring 42 are compression springs. However, they have different spring constants. In the example of FIG. 3B, the spring constant of the second series spring 42 is larger than the spring constant of the first series spring 41. In this case, at a stage in which the first series spring 41 and the second series spring 42 start to be compressively deformed, the spring constant of the biasing member 40 as a whole is the synthetized value of the spring constants of the first series spring 41 and the second series spring 42. When compressive deformation progresses and, for example, the first series spring 41 is deformed to a close contact height, thereafter, the spring constant of the second series spring 42 becomes the spring constant of the biasing member 40 as a whole. That is, the spring constant of the biasing member 40 as a whole changes according to the compression length of the biasing member 40 as a whole. The biasing member 40 may include three or more springs connected in series.

Figure 3C:
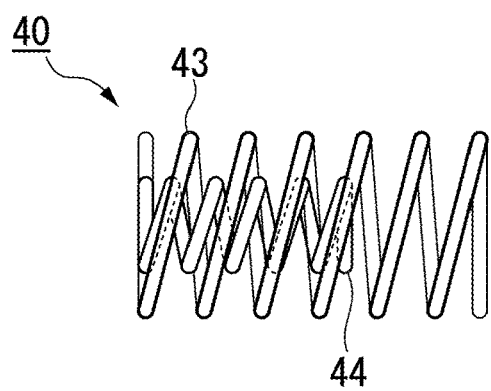
FIG. 3C is a diagram showing an example of a biasing member according to one or more embodiments.

The biasing member 40 shown in FIG. 3C includes a first parallel spring 43 and a second parallel spring 44 connected in parallel. The parallel connection means that a plurality of springs is disposed at an overlapping position in the axial direction. Both the first parallel spring 43 and the second parallel spring 44 are compression springs. However, they have different free lengths. In the example of FIG. 3C, the free length of the second parallel springs 44 is smaller than that of the first parallel springs 43. In this case, since the second parallel spring 44 is not compressively deformed at a stage in which the first parallel spring 43 starts to be compressively deformed, the spring constant of the biasing member 40 as a whole becomes the spring constant of the first parallel spring 43. When the compression deformation of the first parallel spring 43 progresses and the length of the first parallel spring 43 becomes shorter than the free length of the second parallel spring 44, thereafter, the sum of the spring constants of the first parallel spring 43 and the second parallel spring 44 becomes the spring constant of the biasing member 40 as a whole. That is, the spring constant of the biasing member 40 as a whole changes according to the compression length of the biasing member 40 as a whole. The second parallel spring 44 has an outer diameter smaller than the inner diameter of the first parallel spring 43 and may be disposed inside the first parallel spring 43. The biasing member 40 may include three or more springs connected in parallel.

Figure 3D:
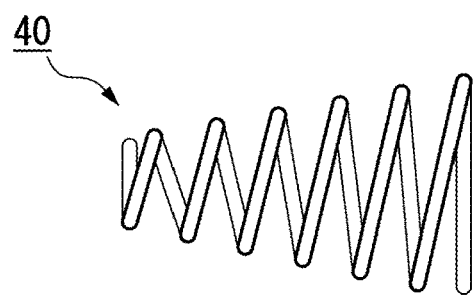
FIG. 3D is a diagram showing an example of a biasing member according to one or more embodiments.

The biasing member 40 shown in FIG. 3D is a compression spring having an outer diameter that changes along the axial direction. More specifically, the biasing member 40 of FIG. 3D is a conical spring whose outer diameter increases toward the front side or the rear side. Such a biasing member 40 also changes in spring constant according to the compression length. A spring other than the conical spring may be adopted as the compression spring having an outer diameter that changes along the axial direction. For example, a so-called barrel-shaped spring may be adopted in which the outer diameters of both end portions in the axial direction are smaller than the outer diameter of an intermediate portion. Alternatively, a so-called hourglass-shaped spring may be adopted in which the outer diameters of both end portions in the axial direction are larger than the outer diameter of an intermediate portion.

Figure 4A:
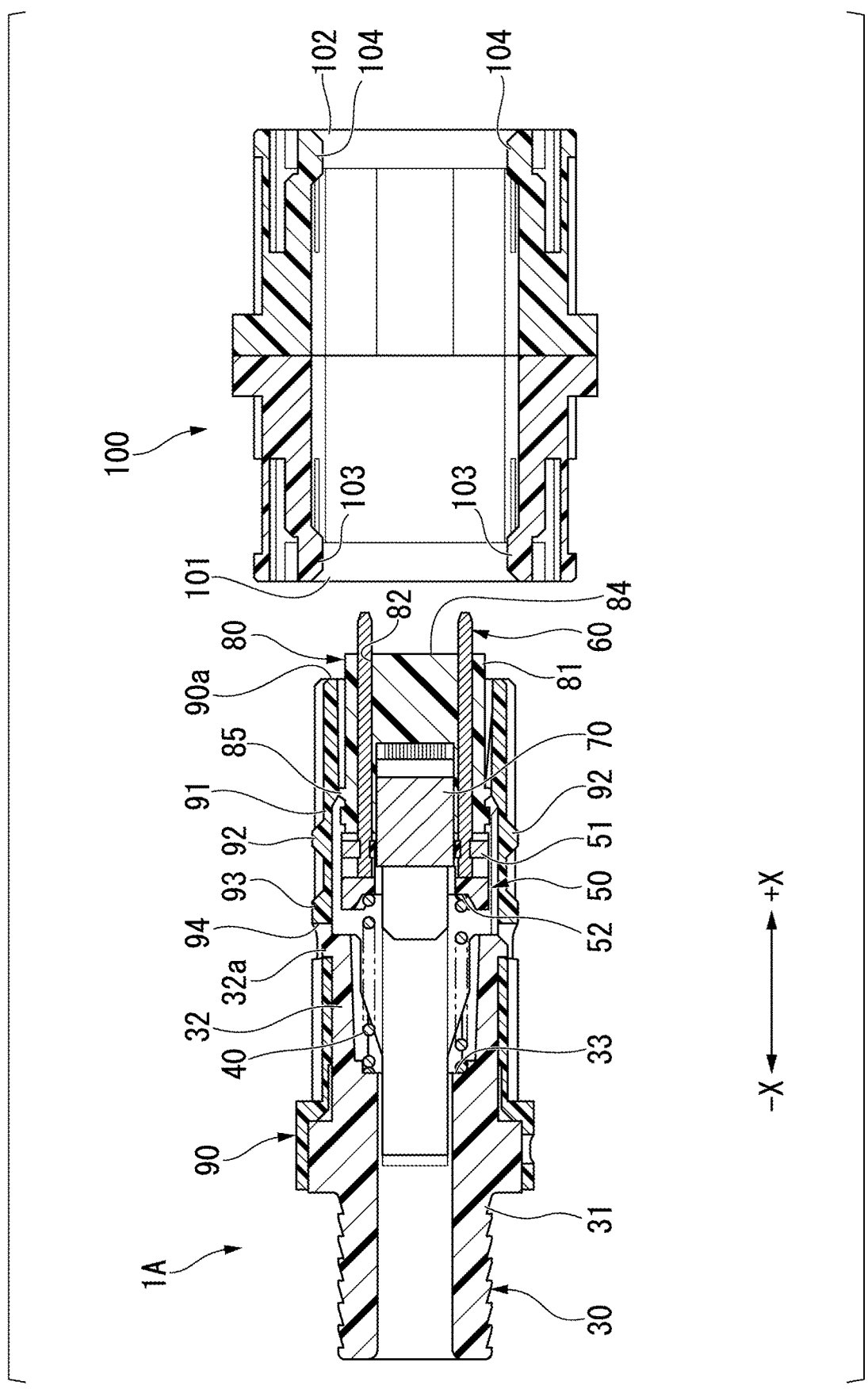
FIG. 4A is a sectional view showing a state where the optical connector of FIG. 1 is connected to an adapter.

FIG. 4A is a sectional view along the axial direction of the optical connector 1A and an adapter 100. In FIG. 4A, the optical connector 1A is in a state where the cap C has been removed, and the illustration of the optical fiber, the cable boot 10, the clamp ring 20, and the coupling 99 is omitted. Further, in order to simplify the illustration, the region where the biasing member 40 is disposed is indicated by an imaginary line. The adapter 100 is used when connecting the male-side optical connector 1A and the female-side optical connector 1B.

As shown in FIG. 4A, the support member 30 has a first support surface 33 facing the front side (the side on which the connection end face 84 of the ferrule 80 is disposed at the time of assembly). Further, the pin clamp 50 has a second support surface 52 facing the rear side (the side on which the support member 30 is disposed at the time of assembly). The biasing member 40 is accommodated within the housing 90 in an axially compressed state between the first support surface 33 and the second support surface 52. In this way, a biasing force directed forward acts on the pin clamp 50. Further, the pin clamp 50 has a contact portion (not shown) that comes into contact with the ferrule 80 from behind the ferrule 80. Therefore, the biasing force generated by the biasing member 40 is also transmitted to the ferrule 80 through the pin clamp 50. In this way, the ferrule 80 is biased forward.

The pin clamp 50 of the male-side optical connector 1A has two holding portions 51 each holding each of the two guide pins 60. The pin clamp 50 of the female-side optical connector 1B may have two projections 53 (refer to FIG. 4D) that are inserted into the guide holes 82, instead of the holding portions 51.

The guide pin 60 has a columnar shape extending in the axial direction. A rear end portion of the guide pin 60 protrudes rearward from the ferrule 80 and is held by the pin clamp 50. A tip portion of the guide pin 60 protrudes forward from the ferrule 80.

The ferrule boot 70 is inserted into the ferrule 80 from behind the ferrule 80. The ferrule boot 70 has an axially extending space for inserting an optical fiber.

The ferrule 80 has the main body portion 81 as described above, and the guide holes 82 and the fiber holes 83 are formed in the main body portion 81. Further, a restricting projection 85 that protrudes outward in the right-left direction is formed in the main body portion 81. The restricting projection 85 comes into contact with a retaining portion (not shown) provided in the housing 90 to restrict the ferrule 80 from falling forward from the housing 90. Therefore, the restricting projection 85 is also called a flange portion.

The connection end face 84, which is a front end face of the main body portion 81, protrudes forward from an opening portion 90a located at the front end of the housing 90. The end face of the optical fiber is exposed on the connection end face 84. The end faces of the optical fibers of the optical connectors 1A and 1B are brought into contact with each other, so that the optical fibers are optically connected. The connection end face 84 may be inclined with respect to the up-down direction, for example, so as to recess rearward as it goes from the top toward the bottom, in order to prevent return light from the optical fiber. The connection end face 84 having such an inclination may be formed by polishing the ferrule 80. In a state where the caps C are mounted to the optical connectors 1A and 1B, the connection end faces 84 are covered with the caps C to suppress the end faces of the optical fibers from being soiled.

The housing 90 includes a tubular housing main body 91 extending in the axial direction. The housing main body 91 is open forward. The front end of the housing main body 91 is the opening portion 90a described above. The support member 30 is inserted into the housing main body 91 from the rear side. Two engaging portions 92, two restricting portions 93, and two locking holes 94 are formed in the housing main body 91. The engaging portions 92 and the restricting portions 93 protrude outward in the right-left direction from both side surfaces (end faces facing in the right-left direction) of the housing main body 91. The engaging portions 92 are located on the front side with respect to the restricting portions 93.

As shown in FIG. 2, the coupling 99 has a tubular shape extending in the axial direction and covers the housing main body 91. The coupling 99 is axially slidable with respect to the housing main body 91 and is configured to be displaced between a position covering the engaging portions 92 and a position exposing the engaging portions 92. A coupling biasing member (not shown) that biases the coupling 99 toward the position covering the engaging portions 92 is provided between the coupling 99 and the housing main body 91.

As shown in FIG. 4A, the adapter 100 has a tubular shape extending in the axial direction, and has a first opening portion 101 and a second opening portion 102. Two first latches 103 that engage with the engaging portions 92 of the optical connector 1A and two second latches 104 that engage with the engaging portions 92 of the optical connector 1B are formed inside the adapter 100. The first latches 103 and the second latches 104 are elastically deformable in the right-left direction.

Next, a process of connecting the optical connector 1A and the optical connector 1B by using the adapter 100 will be described. In the following procedure, the male-side optical connector 1A is first connected to the adapter 100. However, the female-side optical connector 1B may be first connected to the adapter 100.

First, as shown in FIG. 4A, the optical connector 1A is disposed to face the first opening portion 101 of the adapter 100.

Figure 4B:
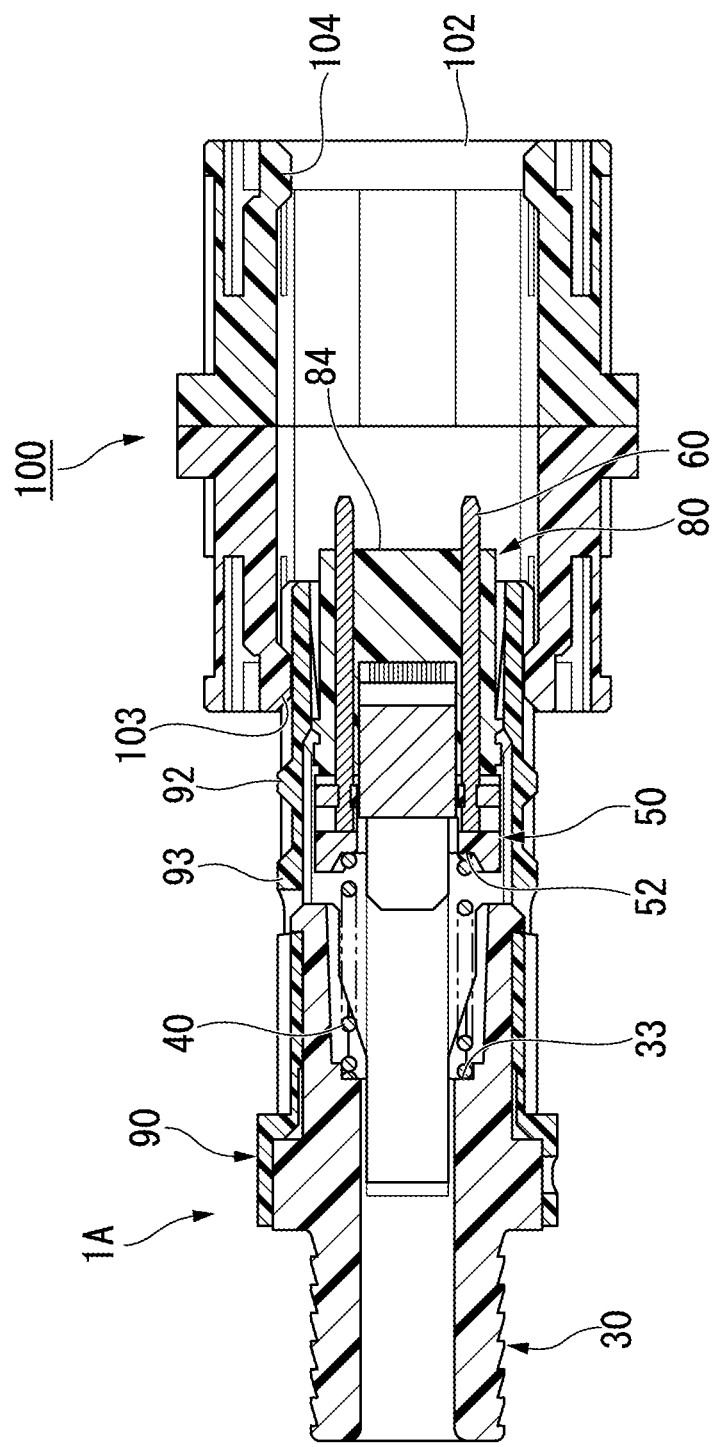
FIG. 4B is a diagram showing a process following FIG. 4A.

Next, as shown in FIG. 4B, the tip of the optical connector 1A is inserted into the adapter 100 through the first opening portion 101. When the optical connector 1A is inserted into the adapter 100 by a predetermined amount, the engaging portions 92 come into contact with the first latches 103. An inclined surface is formed on each of the engaging portion 92 and the first latch 103. Therefore, the engaging portions 92 press the first latches 103 outward in the right-left direction, and the first latches 103 are elastically deformed.

Figure 4C:
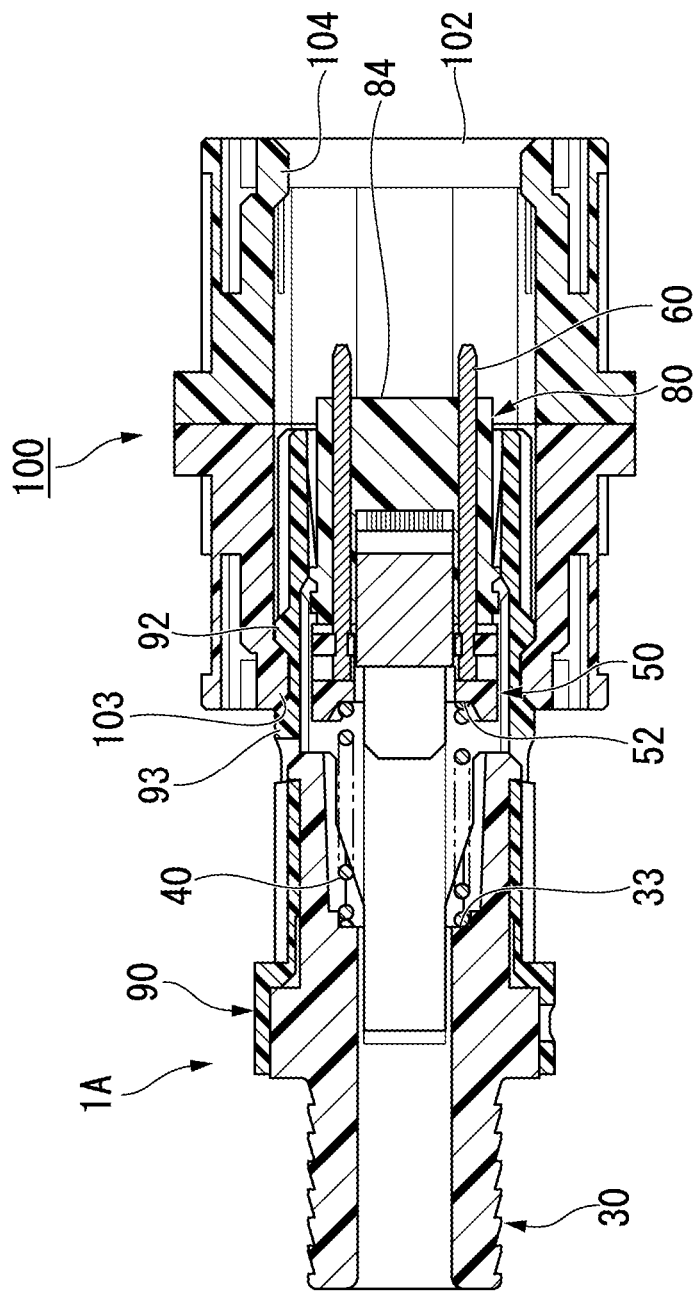
FIG. 4C is a diagram showing a process following FIG. 4B.

When the optical connector 1A is further inserted into the adapter 100, the engaging portions 92 climb over the first latches 103 to move forward. At this time, the first latches 103 are restored and displaced inward in the right-left direction due to an elastic force. In this way, as shown in FIG. 4C, the first latch 103 enters between the engaging portion 92 and the restricting portion 93, and the connection between the optical connector 1A and the adapter 100 is completed.

Figure 4D:
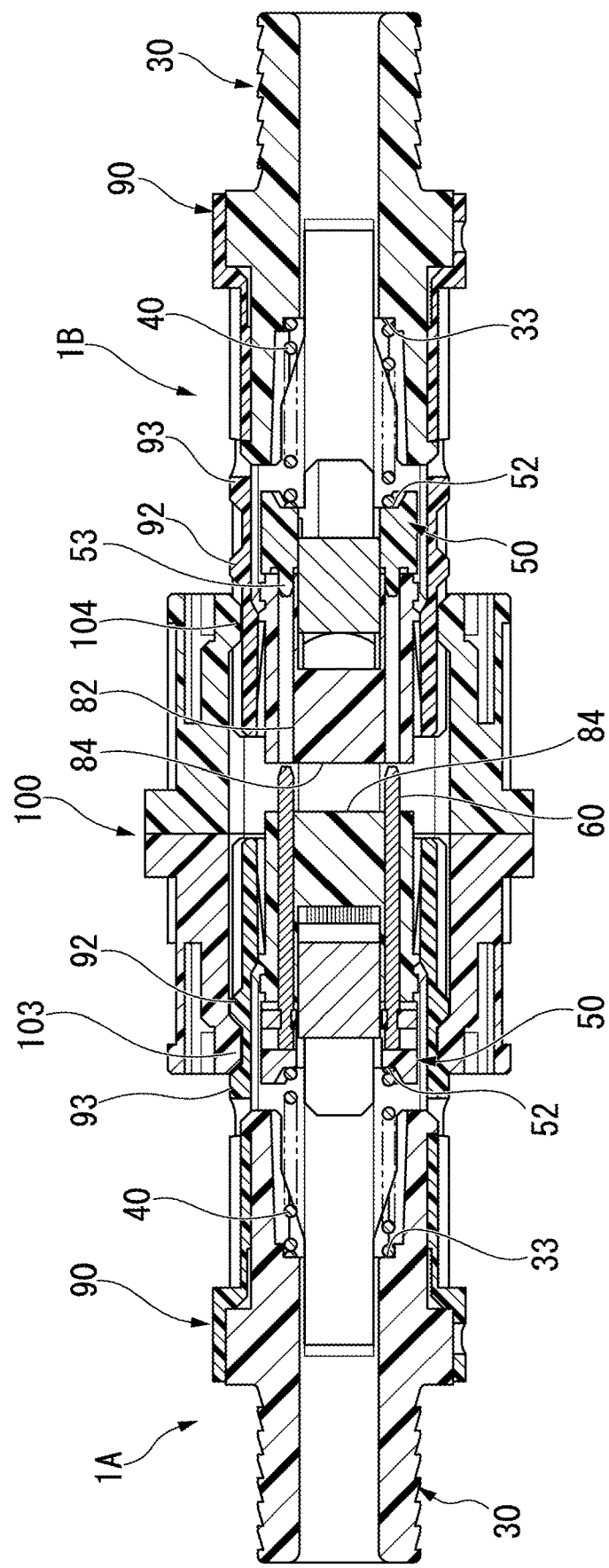
FIG. 4D is a diagram showing a process following FIG. 4C.

Next, as shown in FIG. 4D, the optical connector 1B is inserted into the adapter 100 through the second opening portion 102. In the following description, "front" and "rear" are based on a case as viewed from the optical connector 1A side.

Figure 4E:
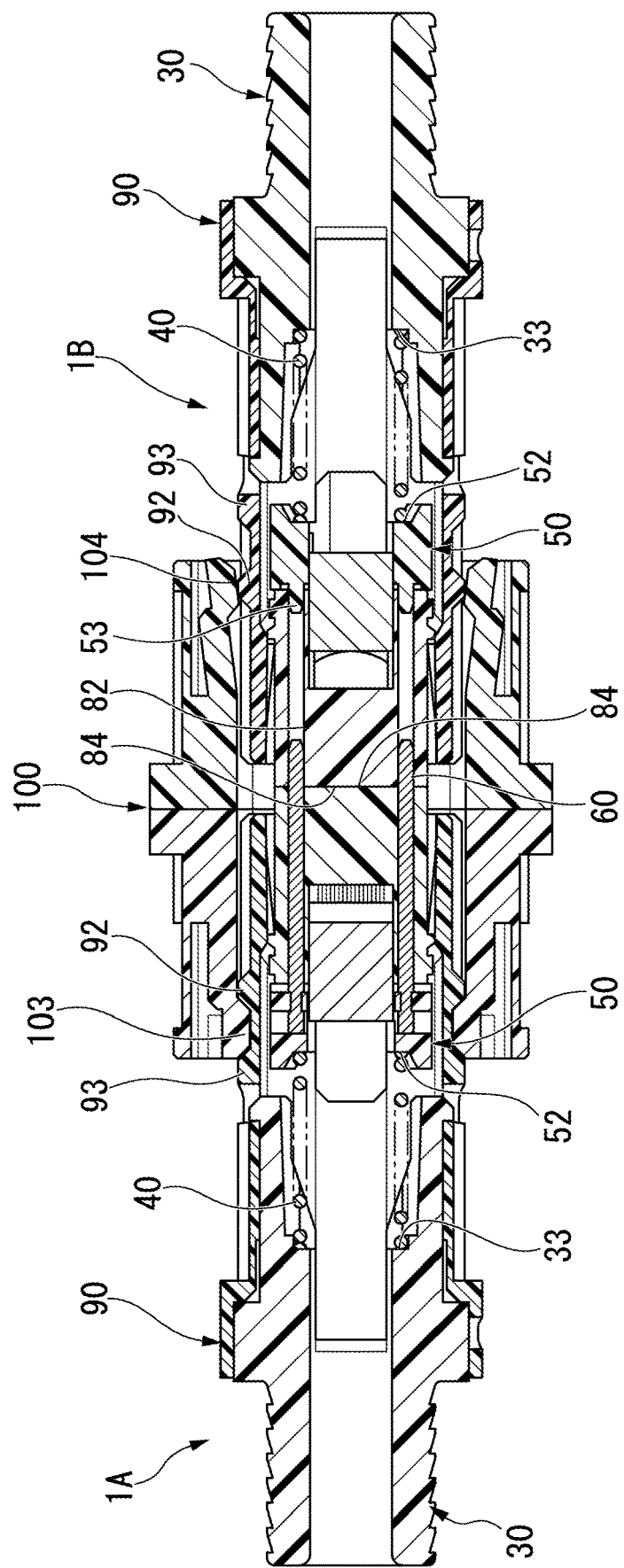
FIG. 4E is a diagram showing a process following FIG. 4D.
Figure 4F:
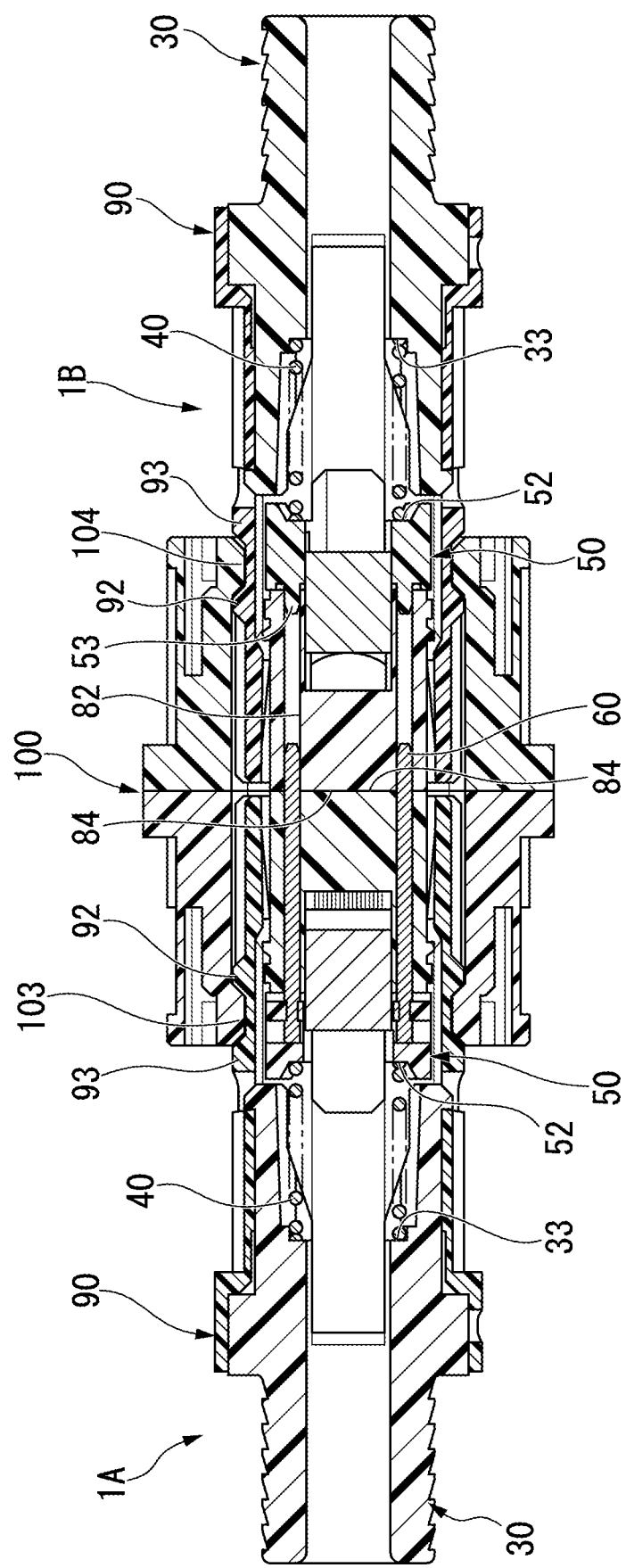
FIG. 4F is a diagram showing a process following FIG. 4E.

When the optical connector 1B is inserted into the adapter 100 by a predetermined amount, the guide pins 60 of the optical connector 1A enter the guide holes 82 of the optical connector 1B, as shown in FIG. 4E. In this way, the positions of the optical connectors 1A and 1B are aligned. Thereafter, the connection end faces 84 of the optical connectors 1A and 1B come into contact with each other. In this specification, as shown in FIG. 4E, the state at the point in time when the contact between the connection end faces 84 is started is referred to as a "contact start state S3".

The state before the contact start state S3 and in which the biasing members 40 are incorporated into the optical connectors 1A and 1B is referred to as an "assembly state S2". Further, the state before the biasing members 40 are incorporated into the optical connectors 1A and 1B is referred to as a "free state S1". The axial length of the biasing member 40 in the free state S1 is a free length. The axial length of the biasing member 40 in the assembly state S2 is shorter than the free length. The axial length of the biasing member 40 is the same between the contact start state S3 and the assembly state S2.

In FIG. 4E, the connection end faces 84 of the optical connectors 1A and 1B come into contact with each other, and at the same time, the engaging portion 92 of the optical connector 1B elastically deforms the second latch 104. However, a timing at which the engaging portion 92 of the optical connector 1B elastically deforms the second latch 104 may be before or after the contact start state S3.

When the optical connector 1B is further inserted into the adapter 100 from the contact start state S3 (FIG. 4E), the ferrule 80 of the optical connector 1B presses the ferrule 80 of the optical connector 1A. In this way, the ferrule 80 of the optical connector 1A is pushed rearward. Thereafter, the engagement between the engaging portion 92 of the optical connector 1B and the second latch 104 is completed, so that a state is created where the optical connectors 1A and 1B are connected to each other through the adapter 100. This state is referred to as a "connected state S4" in this specification.

In the connected state S4, the connection end faces 84 of the optical connectors 1A and 1B are located at the positions where the biasing forces generated by the biasing members 40 of the optical connectors 1A and 1B are balanced. At this time, a state where the ferrules 80 are pressed against each other with a predetermined pressing force is achieved, and the connection between the optical fibers of the optical connectors 1A and 1B is stabilized.

Here, as a result of extensive studies by the inventors of the present application, it has been found that when the guide pin 60 of the male-side optical connector 1A enters the guide hole 82 of the female-side optical connector 1B, there is a case where shavings occur due to scraping of the ferrule 80 of the optical connector 1B. If the shavings adhere to the connection end face 84, the positional relationship between the end faces of the optical fibers becomes unstable, increasing a connection loss. Then, the magnitude of the connection loss varies according to the presence or absence of shavings or the adhered state of shavings. As a result, the connection loss of the optical fiber varies each time the optical connectors 1A and 1B are connected to each other.

When the guide pin 60 of the optical connector 1A enters the guide hole 82 of the optical connector 1B, that is, in the assembly state S2 and the contact start state S3, the larger the biasing force acting on the ferrule 80, the more easily the shavings as described above occur.

In a case where the connection end face 84 of the ferrule 80 is inclined with respect to the up-down direction, the larger the biasing force acting on the ferrule 80 in the contact start state S3, the more the connection end faces 84 of the optical connectors 1A and 1B are difficult to be set at proper positions. In a case where the positional relationship between the connection end faces 84 is not proper, the optical fibers of the optical connectors 1A and 1B are misaligned, resulting in variation in connection loss.

From the above, it is preferable that the biasing force acting on the ferrule 80 in the contact start state S3 is as small as possible.

On the other hand, if the biasing force acting on the ferrule 80 in the connected state S4 is small, the connection loss becomes unstable. Further, the biasing force acting on the ferrule 80 in the connected state S4 is determined by a standard and there is a case where it cannot be changed. Therefore, it is not preferable to simply reduce the biasing force that is generated by the biasing member 40.

Therefore, in one or more embodiments, a nonlinear spring is adopted as the biasing member 40. In this way, it becomes possible to increase the biasing force in the connected state S4 while reducing the biasing force in the assembly state S2 and the contact start state S3. A more detailed description will be given below.

In the following description, the amount of change in the biasing force acting on the ferrule 80 with respect to the amount of displacement of the ferrule 80 in the axial direction is simply referred to as a "rate of change". Further, the amount of change in the biasing force generated by the biasing member 40 with respect to the compression length of the biasing member 40 in the axial direction is referred to as a "spring constant". Since the biasing member 40 is a nonlinear spring, the spring constant is not necessarily a constant value.

Figure 5A:
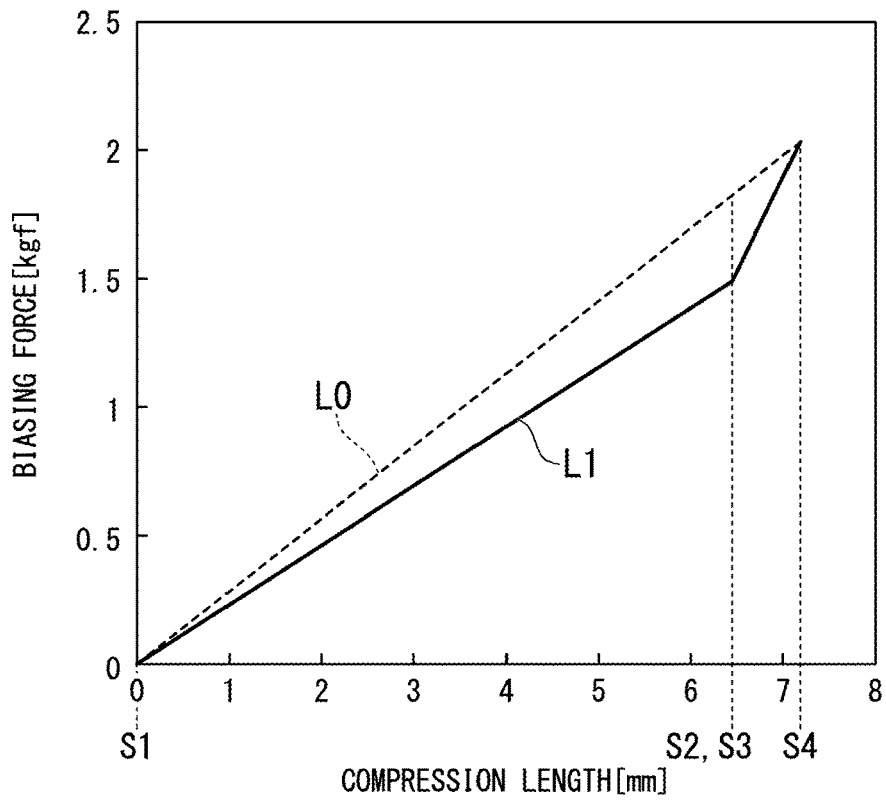
FIG. 5A is a diagram showing an example of spring characteristics of the biasing member according to one or more embodiments.
Figure 5B:
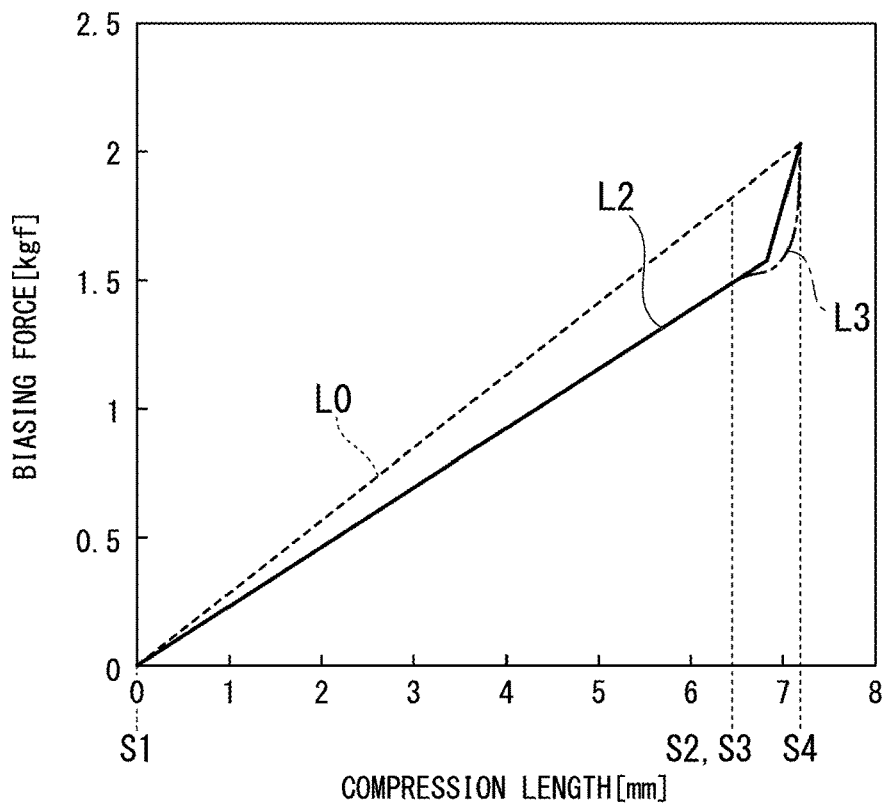
FIG. 5B is a diagram showing an example of spring characteristics of the biasing member according to one or more embodiments.

FIGS. 5A and 5B show examples of spring characteristics of the biasing member 40. In the graphs in FIGS. 5A and 5B, the horizontal axis is the compression length of the biasing member 40 in the axial direction, and the vertical axis is the biasing force that is generated by the biasing member 40. In a case where the compression length is 0 mm, it indicates that the biasing member 40 is in the free state S1. In FIGS. 5A and 5B, the compression length of the biasing member 40 in the assembly state S2 and the contact start state S3 is approximately 6.5 mm, and the compression length of the biasing member 40 in the connected state S4 is approximately 7.2 mm. However, the compression lengths of the biasing member 40 in the assembly state S2, the contact start state S3, and the connected state S4 may be changed appropriately.

In FIGS. 5A and 5B, a graph L0 shows a case where a linear spring is used as the biasing member 40. Since the spring constant of the linear spring does not substantially change, the slope of the graph L0 (that is, the spring constant) is constant from the free state S1 to the connected state S4. In contrast, a graph L1 shows a case where a nonlinear spring is used as the biasing member 40. The spring constant of the nonlinear spring changes according to its compression length. In the example of the graph L1, the spring constant from the free state S1 to the assembly state S2 is smaller than the spring constant from the assembly state S2 to the connected state S4.

Here, when the graphs L0 and L1 are compared, the biasing force (the value on the vertical axis) in the connected state S4 is the same. However, the biasing force in the assembly state S2 and the contact start state S3 is smaller in the graph L1 than in the graph L0. This is because in the graph L1, a nonlinear spring is used as the biasing member 40, as described above. Then, the biasing force in the assembly state S2 and the contact start state S3 is reduced, so that it is possible to restrain the ferrule 80 from being scraped when the guide pin 60 of the male-side optical connector 1A enters the guide hole 82 of the female-side optical connector 1B. Therefore, generation of shavings of the ferrule 80 is suppressed. Alternatively, in a case where the connection end face 84 of the ferrule 80 is inclined, the connection end faces 84 are easily set in a more appropriate positional relationship. Therefore, it is possible to reduce variation in the connection loss in the optical connectors 1A and 1B.

As the biasing member 40, a nonlinear spring having characteristics such as graphs L2 and L3 shown in FIG. 5B may be adopted. In the case of the graph L2, when the compression length is between the contact start state S3 and the connected state S4, the spring constant of the biasing member 40 changes. In the case of the graph L3, the spring constant curvilinearly changes between the contact start state S3 and the connected state S4. Even with the nonlinear spring having such characteristics, effects similar to those of the graph L1 can be obtained.

As described above, each of the optical connectors 1A and 1B of one or more embodiments includes the ferrule 80 formed with the fiber hole 83 into which the optical fiber is inserted and the guide hole 82 into which the guide pin 60 is inserted, the housing 90 that accommodates the ferrule 80 therein, and the biasing member 40 that is accommodated in the housing 90 and applies a biasing force directed toward a side close to the opening portion 90a of the housing 90 in the axial direction of the guide hole 82 to the ferrule 80, and the biasing force has nonlinear characteristics, More specifically, in the graphs L1 to L3 shown in FIGS. 5A and 5B, the rate of change in the biasing force (the slope of the graph) with respect to the amount of displacement of the ferrule 80 in the axial direction in the assembly state S2 before the ferrule 80 comes into contact with another ferrule 80 is smaller than the rate of change in the connected state S4 in which the optical connector and another optical connector (the optical connectors 1A and 1B) are connected to each other.

With such a configuration, it is possible to reduce the biasing force when the guide pin 60 of the male-side optical connector 1A is inserted into the guide hole 82 of the female-side optical connector 1B, while securing the biasing force acting on the ferrule 80 after the optical connectors 1A and 1B are connected to each other. Therefore, it is possible to suppress variation in the connection loss between the optical connectors 1A and 1B due to shavings caused by scraping of the female-side ferrule 80.

As shown in the graphs L1 to L3, the spring constant of the biasing member 40 may be a predetermined constant in the free state S1 before the biasing member 40 is accommodated in the housing 90, and the spring constant of the biasing member 40 may be larger than the predetermined constant in a state where the ferrule 80 is accommodated in the housing 90 and pushed rearward.

Further, the biasing member 40 may include an irregular pitch coil spring as shown in FIG. 3A. Such an irregular pitch spring can be easily replaced from a normal compression spring, and a shape which has been conventionally used as the housing 90 can be used as it is (or with a minor design change).

Further, in the irregular pitch coil spring, the pitch Pm at the intermediate portion (the intermediate region Am) in the axial direction may be smaller than the pitch Pe at the both end portions (the end portion regions Ae) in the axial direction.

As shown in FIG. 3B, the biasing member 40 may include the first series spring 41 and the second series spring 42 having a larger spring constant than the first series spring 41, and the first series spring 41 and the second series spring 42 may be connected in series.

As shown in FIG. 3C, the biasing member 40 may include the first parallel spring 43 and the second parallel spring 44 having a smaller free length than the first parallel spring 43, and the first parallel spring 43 and the second parallel spring 44 may be connected in parallel.

Further, the second parallel spring 44 may have an outer diameter smaller than the inner diameter of the first parallel spring 43 and be disposed inside the first parallel spring 43. In this case, the two springs can be disposed while reducing the occupied volume of the biasing member 40 as a whole.

The biasing member 40 may include a compression spring having an outer diameter that changes along the axial direction.

The technical scope of the present invention is not limited to the above embodiments, and various modifications can be made within a scope which does not depart from the gist of the present invention.

For example, the shapes of the graphs shown in FIGS. 5A and 5B and the numerical values shown on the horizontal and vertical axes are examples, and may be changed appropriately.

Some of the components shown in FIG. 2 may be omitted.

In addition, it is possible to appropriately replace the components in the embodiments described above with well-known components within a scope which does not depart from the gist of the present invention, and the embodiments or modification examples described above may be combined appropriately.

For example, the plural types of biasing members 40 shown in FIGS. 3A to 3D may be used in combination within one optical connector 1A or 1B.

Specifically, the biasing member 40 may include a plurality of series-connected or parallel-connected irregular pitch springs.

The biasing member 40 may include a plurality of series-connected or parallel-connected compression springs each having an outer diameter that changes in the axial direction.

The biasing member 40 may include a compression spring having outer diameter that change in the axial direction and an irregular pitch spring, which are connected in series or connected in parallel.

REFERENCE SIGNS LIST 1A, 1B: optical connector
40: biasing member
41: first series spring
42: second series spring
43: first parallel spring
44: second parallel spring
60: guide pin
80: ferrule
82: guide hole
83: fiber hole
90: housing
90a: opening portion

What is claimed is:

1. An optical connector comprising:
   a ferrule having a fiber hole into which an optical fiber is inserted and a guide hole into which a guide pin is inserted;
   a housing that accommodates the ferrule; and
   a biasing member, disposed in the housing, that applies to the ferrule a biasing force directed toward a side close to an opening portion of the housing in an axial direction of the guide hole, the biasing force having nonlinear characteristics, wherein
   the biasing member includes a first parallel spring having a first free length and a second parallel spring having a second free length smaller than the first free length, and
   the first parallel spring and the second parallel spring are connected in parallel.

2. The optical connector according to claim 1, wherein a rate of change in the biasing force with respect to an amount of displacement of the ferrule in the axial direction in an assembly state before the ferrule contacts another ferrule is smaller than a rate of change in a connected state where the optical connector connects with another optical connector.

3. The optical connector according to claim 1, wherein a spring constant of the biasing member is a predetermined constant in a free state before the housing accommodates the biasing member, and is larger than the predetermined constant in a state where the housing accommodates the ferrule such that the ferrule is disposed at a rear of the housing.

4. The optical connector according to claim 1, wherein the biasing member includes an irregular pitch coil spring.

5. The optical connector according to claim 4, wherein in the irregular pitch coil spring, a pitch at an intermediate portion in the axial direction is smaller than a pitch at both end portions in the axial direction.

6. The optical connector according to claim 1, wherein the biasing member includes a compression spring having an outer diameter that changes along the axial direction.

* * * * *